United States Patent
Bai (10) Patent No.: US 10,556,336 B1
(45) Date of Patent: Feb. 11, 2020

(54) DETERMINING ROBOT INERTIAL PROPERTIES

(71) Applicant: X Development LLC, Mountain View, CA (US)

(72) Inventor: Yunfei Bai, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 452 days.

(21) Appl. No.: 15/419,451

(22) Filed: Jan. 30, 2017

(51) Int. Cl.
*B25J 9/16* (2006.01)

(52) U.S. Cl.
CPC ... *B25J 9/1605* (2013.01); *G05B 2219/40316* (2013.01)

(58) Field of Classification Search
CPC ............ B25J 9/1605; G05B 2219/40316
USPC .......................................... 703/2, 7
See application file for complete search history.

(56) References Cited

U.S. PATENT DOCUMENTS

| | | | | |
|---|---|---|---|---|
| 7,684,896 | B2* | 3/2010 | Dariush | A61B 5/1038 318/560 |
| 2004/0021660 | A1* | 2/2004 | Ng-Thow-Hing | G06K 9/00369 345/419 |
| 2010/0152899 | A1* | 6/2010 | Chang | B25J 9/162 700/262 |
| 2015/0088469 | A1* | 3/2015 | Nagarajan | B25J 9/1671 703/2 |
| 2015/0283704 | A1* | 10/2015 | Watanabe | B25J 9/1612 700/259 |
| 2016/0257000 | A1* | 9/2016 | Guerin | B25J 9/1605 |
| 2017/0344832 | A1* | 11/2017 | Leung | G06T 7/292 |
| 2019/0077014 | A1* | 3/2019 | Radrich | B25J 9/163 |

OTHER PUBLICATIONS

Rodriguez "Kalman Filtering, Smoothing, and Recursive Robot Arm Forward and Inverse Dynamics". IEEE Journal of Robotics and Automation, vol. RA-3. No. 6, Dec. 1987 (Year: 1987).*
An et al. "Estimation of inertial parameters of rigid body links of manipulators," Proceedings of the 24$^{th}$ Conference on Decision and Control, Ft. Lauderdale, FL, Dec. 1985, 6 pages.
Armstrong, "On finding 'exciting' trajectories for identification experiments involving systems with non-linear dynamics," The International Journal of robotics research, 8(6), Dec. 8, 1989, 9 pages.
Atkeson et al. "Estimation of Inertial Parameters of Manipulator Loads and Links," The International Journal of Robotics Research, 5.3, 1986, 19 pages.

(Continued)

*Primary Examiner* — Eunhee Kim
(74) *Attorney, Agent, or Firm* — Fish & Richardson P.C.

(57) ABSTRACT

Methods and systems for modifying the inertial parameters used in a virtual robot model that simulates the interactions of a real-world robot with an environment to better reflect the actual inertial properties of the real-world robot. In one aspect, a method includes obtaining joint physical parameter measurements for the joints of a real-world robot, determining simulated joint physical parameter values for each of the joint physical parameter measurements, and adjusting an estimate of inertial properties of the real-world robot used by the virtual robot dynamic model to reduce a difference between the simulated joint physical parameter values and the corresponding joint physical parameter measurements.

17 Claims, 3 Drawing Sheets

(56) References Cited

OTHER PUBLICATIONS

Khosla, "Parameter identification of robot dynamics," 1985 $24^{th}$ IEEE Conference on Decision and Control, Dec. 11-13, 1985, 7 pages.
Kolev et al. "Physically consistent state estimation and system identification for contacts," $15^{th}$ International Conference on Humanoid Robots, Nov. 3-5, 2015, Korea, 8 pages.
Leite, "Parameter identification and contact modeling for planetary wheeled rovers in soft soil," $16^{th}$ IFAC Symposium on System Identification, The International Federation of Automatic Control, Belgium, Jul. 11-13, 2012, 6 pages.
Pamies-Vila et al. "Parameter identification method for a three-dimensional foot-ground contact model," Mechanism and Machine Theory, vol. 75, May 2014, 10 pages.
Weber et al. "Identification of Contact Dynamics Model Parameters From Constrained Robotic.Operations," Journal of dynamic systems, measurement, and control 128.2, Jun. 1, 2006, 10 pages.
Bernakiewicz et al "The role of parameter identification in finite element contact analysis with reference to orthopaedic biomechanics application," Journal of Biomechanics, 35.1, Jan. 2002, 7 pages.

\* cited by examiner

DETERMINING ROBOT INERTIAL PROPERTIES

BACKGROUND

This specification relates to techniques for determining inertial properties used in a simulated environment to model dynamic behavior of the robot in a real environment.

There is a reality gap between a simulated environment and a real environment. Control and learning algorithms that work effectively for a virtual robot in a simulation may perform poorly on a robot in the real environment. One cause of the reality gap may be attributed to various simplifications made in simulation algorithms, such as using inaccurate physical parameters, simplifying contact models, ignoring hardware limitations, noise, and latency.

SUMMARY

The subject matter of the present disclosure relates to techniques for reducing the "reality gap" that exists between simulated commands in software and the real movements of a robot receiving the commands. In general, the techniques modify the inertial parameters used in a virtual robot model that simulates the interactions of a real-world robot with an environment to better reflect the actual inertial properties of the real-world robot.

Physical measurements of one or more joint angle/positions and joint torques of a real-world robot are obtained, and then provided as input to a virtual dynamic robot model. The virtual dynamic robot model may utilize one or more of the following steps to extract optimized inertial properties for the real-world robot. A finite differencing approach is used to extract joint velocities and accelerations from the joint position measurements. The process of finite differencing intrinsically adds noise to the system, and therefore a median filter is utilized in a post-processing step. A nonlinear least square (NLS) problem is formulated, with the one or more measured torques from hardware measurements, and the motion data, in the form of the extracted joint velocity and acceleration information. Simulated torque values are extracted from software using recursive inverse dynamics. The NLS equation is then solved for the optimal inertial properties, which minimize the difference between measured torques and simulated torques, using a NLS solver, e.g., Ceres. The optimal inertial properties for the real-world robot may then be used by a simulated virtual dynamic model of the real-world robot in an URDF/SDF format.

Particular embodiments of the subject matter described in this specification can be implemented so as to realize one or more of the following advantages. This technique benefits from the ability to decouple the inertial properties from robot control limitations and friction, and is less computationally intensive because of the implementation of recursive inverse dynamics for an articulated rigid body. Additionally, by decoupling the inertial properties from robot control limitations and friction, an estimation of the inertial properties for the real-world robot may be more accurate than other formulation approaches (e.g., forward dynamic simulation). Moreover, this approach can be applied to a generic set of robots each having different kinematic structure without re-formulating the problem, and treats the dynamics of a robot as a black box rather than solving the equations of motion for the robot explicitly.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A virtual dynamic robot model may include an estimate of inertial properties of a real-world robot such that the dynamical behavior (e.g., dynamic motion under joint control and gravity) of a simulated robot using a virtual dynamic robot model closely matches the dynamical behavior of the real-world robot.

The present disclosure relates to a method for obtaining a plurality of joint physical parameter measurements for the joints of a real-world robot using a robot management system operating a real-world robot, and adjusting an estimate of inertial properties of the real-world robot used by a virtual robot dynamic model to simulate interactions of the real-world robot with an environment using the robot management system. The robot management system adjusts the estimate of the inertial properties used by the virtual robot dynamic model by determining a respective simulated joint physical parameter value for each of the joint physical parameter measurements, and adjusting a current estimate of the inertial properties used by the virtual robot dynamic model to reduce a difference between the simulated joint physical parameter values and the corresponding joint physical parameter measurements.

In some implementations, determining a corresponding simulated joint physical parameter value is done using recursive inverse dynamics, using data corresponding to a joint physical parameter measurement and the current estimate of the one or more inertial properties.

In some implementations, a robot management system may be used to generate control commands for a real-world robot. The robot management system may provide control commands to be executed by a real-world robot and collect data responsive to the executed control commands from the real-world robot. The data collected from the real-world robot may be used by the robot management system to update the inertial properties utilized by a virtual robot dynamic model. Updating the inertial properties utilized by the virtual robot dynamic model may improve the simulated dynamic movements of the real-world robot and the real-world robot performance.

One approach for optimizing parameters (e.g., improving the accuracy of one or more inertial properties used by the virtual robot dynamic model) may be to optimize parameters one link at a time, where a link is an articulated segment of the robot (e.g., a robot arm link, or a robot finger link). Optimization may begin at a tip of a set of links forming a robot articulated segment, and proceed sequentially through each link until reaching the base of the articulated segment. For example, optimizing the inertial properties of a robot fingertip and proceeding to optimizing the inertial properties of the hand segment, arm segment, and shoulder segment, respectively. Each link may be decoupled such that a different subset of variables is utilized in the optimization (e.g., different mass, center of mass, inertia tensor). Additionally, error propagation may be reduced by isolating errors associated with each link individually.

Inertial properties of a real-world robot include mass, center of mass, and inertia tensor. Inertial properties of a real-world robot may be decoupled from other properties including one or more of joint damping, joint friction, other friction parameters, and control parameters. In some implementations, when finding the inertial properties of a real-world robot, the torque control mode for a controller of a real-world robot should be used while maintaining a constant motor torque for the real-world robot and a simulated virtual robot.

Figure 1:
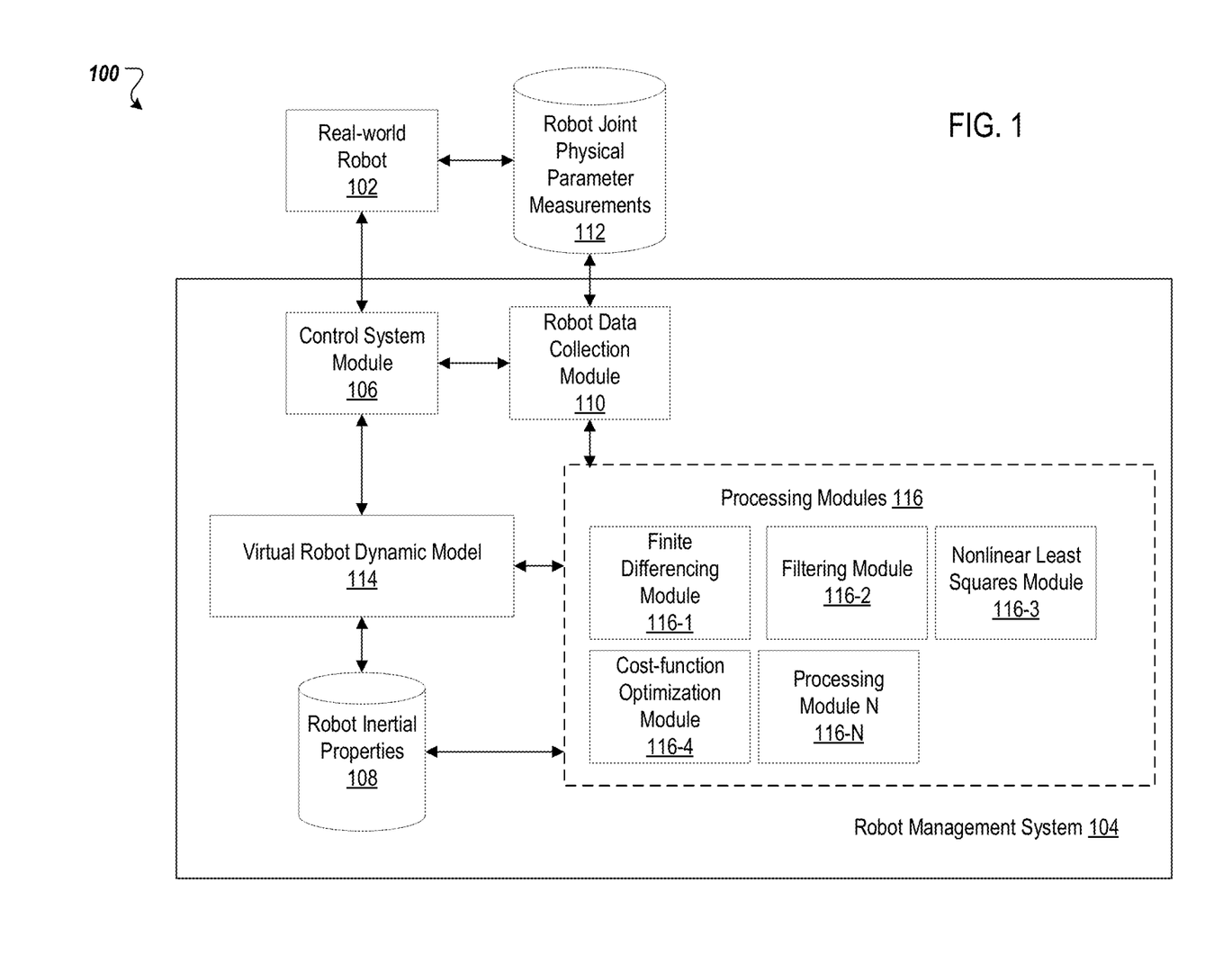
FIG. 1 is a block diagram of an exemplary environment in which a real-world robot is in communication with a robot management system.

FIG. 1 is a block diagram of an exemplary environment 100 in which a real-world robot 102 is in communication with a robot management system 104, which may be implemented as one or more computer programs on one or more data processing apparatuses. The robot management system 104 may include a control system module 106 of the real-world robot 102, information about one or more robot inertial properties 108, and robot data collection module 110 for collecting robot joint physical parameter measurements 112 for the real-world robot 102. Different aspects of real-world robot 102 may be simulated, including the dynamic properties, by a virtual robot dynamic model 114. The virtual robot dynamic model 114 may use one or more of the robot inertial properties 108 to simulate the dynamic properties of the real-world robot 102.

A robot management system 104 may be used to adjust and optimize the robot inertial properties 108 used in a virtual robot dynamic model 114, such that the robot inertial properties 108 used by the virtual robot dynamic model 114 closely match the actual inertial properties of the real-world robot 102, and the reality gap between the real-world robot and simulation is minimized. The robot management system 104 may additionally adjust and optimize robot inertial properties 108 for multiple ranges of motion of a real-world robot 102, such that the virtual robot dynamic model 114 may closely model actual inertial properties of the real-world robot 102 through multiple ranges of dynamic motion.

The control system module 106 may include one or more executable operational instructions from the robot management system 104 to the real-world robot 102. For example, a control system module 106 for a robot may include a set of operational instructions to the robot such that the robot will execute a series of motions within a proscribed range of motion.

In some implementations the control system module 106 may include an interactive environment (e.g., a graphical user interface) through which a user may input/modify a set of operational instructions within the robot management system 104 for the real-world robot 102.

The control system module 106 may generate one or more executable instructions for the real-world robot 102. The executable instructions (e.g., a command to rotate a link of the robot) may incorporate one or more simulated dynamic properties of the real-world robot 102 from a virtual robot dynamic model 114. The virtual robot dynamic model 114 models the dynamic properties of the real-world robot 102, in part, by using the robot inertial properties 108. Additionally, the virtual robot dynamic model 114 may include information about the real-world robot 102 provided by the manufacturer (e.g., range of motion). For example, a control system module 106 containing a set of executable instructions to a real-world robot 102 to pick up an object would take into account the possible range of motion and robot inertial properties 108 defined in a virtual robot dynamic model 114 for the real-world robot 102.

The robot joint physical parameter measurements 112 may be collected using a robot data collection module 110. The robot joint physical parameter measurements 112 include joint torques, joint positions, and the like. A set of executable instructions for the control system module 106 may be determined, in part, on the dynamic properties of the real-world robot 102 from the virtual robot dynamic model 114. The robot data collection module 110 may include executable instructions that command the movement of one or more joints of the real-world robot 102 through a determined range of motion available for the real-world robot 102. The robot joint physical parameter measurements 112 of the real-world robot 102 in response to the executed instructions of the control system module 106 are collected by the robot data collection module 110.

In some implementations, for each determined range of motion defined by the virtual robot dynamic model 114 of the real-world robot 102, a new set of robot joint physical parameter measurements 112 is collected. For example, the robot joint physical parameter measurements 112 for a robot operating at or near the limits of its available range of motion may be different (e.g., because of servo motor limits) than the robot joint physical parameter measurements 112 for the robot operating well within its available range of motion.

In some implementations, one or more of the control system module 106, robot inertial properties 108, robot data collection module 110 may be provided for the real-world robot 102 by a manufacturer of the real-world robot 102.

In some implementations, the one or more robot inertial properties 108 may be provided by a manufacturer of the real-world robot 102. For example, a robot description file written in URDF/SDF may be provided with the real-world robot 102 by the manufacturer.

A non-exhaustive list of robot inertial properties 108 include robot mass, robot center of mass, and a robot inertia tensor. In some implementations, a manufacturer of a robot may set default values of mass, center of mass and inertia tensor for a particular design of robot (e.g., a vertically articulated robot, or a SCARA robot) for all of the robots manufactured for the particular design. The default inertial properties may then be implemented in the virtual robot dynamic model 114 provided with the real-world robot 102. However, due to manufacturing line variation, lack of direct measurement of the robot inertial properties, and/or the focus on kinematics instead of dynamics in the virtual dynamic robot model, one or more of the robots manufactured of the same particular design may have actual inertial properties that differ from the default values specified by the manufacturer.

The robot management system 104 may be used to optimize one or more of the robot inertial parameters 108 used by the virtual robot dynamic model 114, such that a control system module 106 providing instructions to the real-world robot 102 results in a reduced reality gap between the instructed motions from the control system module 106 and the real-world robot 102 performance. The robot management system 104, may implement a one or more processing modules 116 for adjusting an estimate of one or more robot inertial properties 108 of the real-world robot 102 using the robot joint physical parameter measurements 112. One such implementation of a set of processing modules 116 will be described herein with reference to FIG. 2, but does not represent the full extent of implementations possible. Although the processing by the robot management system 104 for adjusting an estimate of one or more robot inertial properties 108 is described herein in terms of a set of one or more processing modules, other methods for collecting data, processing the collected data, and generating adjusted estimates of the one or more robot inertial properties 108 is possible (e.g., not using modules).

Processing modules 116 may include a finite differencing module 116-1, a filtering module 116-2, a nonlinear least squares module 116-3, and a cost-function optimization module 116-4. Other processing modules in the form of processing module N 116-N may be implemented by the robot management system 104.

Figure 2:
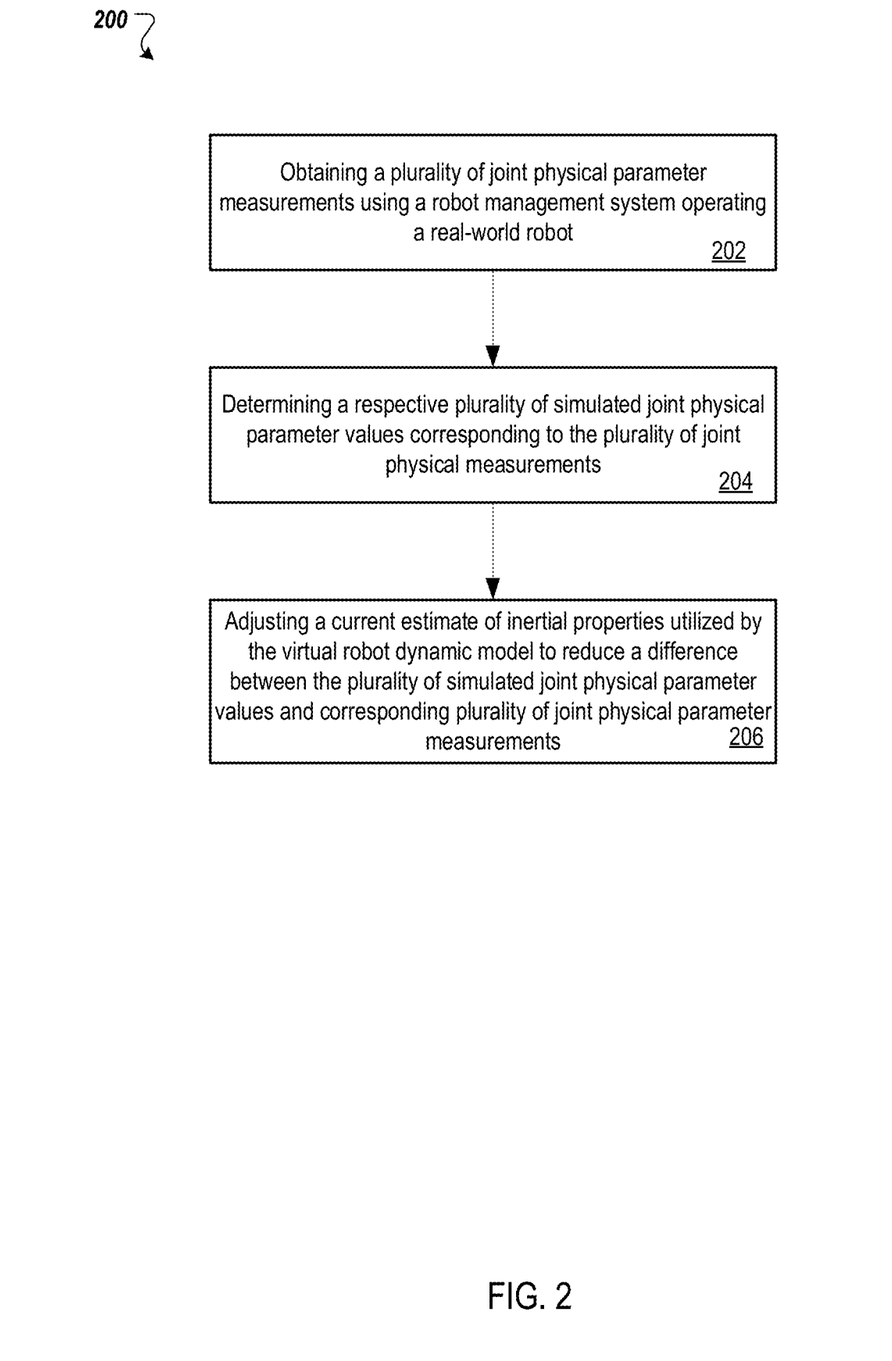
FIG. 2 is a flow diagram of an exemplary process for optimizing one or more inertial properties of a robot used by a virtual robot dynamic model.

FIG. 2 is a flow diagram of an exemplary process for optimizing one or more inertial properties of a robot used by a virtual robot dynamic model.

The robot management system 104 collects one or more robot joint physical parameter measurements 112 using the robot data collection module 110 from real-world robot 102 (202). In some implementations, a set of instructions executable by the real-world robot 102 are provided to the real-world robot 102 by the robot management system 104 in a control system module 106. The one or more executable instructions within the control system module 106 may be determined in part by the virtual robot dynamic model 114 which has a set of one or more current estimated robot inertial properties 108. The real-world robot 102 then executes the set of instructions from the control system module 106 and the robot data collection module 110 collects the robot joint physical parameter measurements 112 that result from the real-world robot 102 executing the instructions from the control system module 106.

The one or more robot joint physical parameter measurements 112 (e.g., joint torque measurements, joint position measurements) are provided by the robot management system 104 as input to one or more processing modules 116 in addition to current estimates of one or more robot inertial properties 108 (e.g., mass, center of mass, inertia tensor).

In some implementations, a finite differencing module 116-1 receives as input, from the robot management system 104, the one or more robot joint physical parameter measurements 112 (e.g., joint position measurements) for the real-world robot collected by the robot data collection module 110, and uses a finite differencing method to extract one or more corresponding joint velocity values and joint acceleration values from the one or more joint position measurements. The finite differencing module 116-1 may then output, to the robot management system 104, one or more joint velocity values and one or more joint acceleration values for the real-world robot. The one or more outputted values may include a level of signal noise associated with each value, resulting from the finite differencing method.

The one or more joint velocity values and joint acceleration values may then be received as input, from the robot management system 104, by the filtering module 116-2. The filtering module 116-2 performs noise reduction on one or more of the joint velocity values and joint acceleration values using a median filter. In some implementations, other filtering techniques may be utilized by the filtering module instead of, or in addition to, the median filter (e.g., Gaussian filtering). The output, to the robot management system 104, from the filtering module 116-2 includes the one or more joint velocity and joint acceleration values which have been post-processed to reduce noise.

Following the determining of the one or more joint velocity and joint acceleration values, the nonlinear least squares module 116-3 receives as input, from the robot management system 104, the one or more joint position, joint velocity, and joint acceleration values as well as one or more joint torque measurements from the robot joint physical parameter measurements 112. A nonlinear least squares equation is formulated:

$$\Sigma_{min} \|\tau_{real} - \tau_{simulation}\|^2$$

where $\tau_{real}$ is a measured torque from the real-world robot, $\tau_{simulation}$ is a simulated torque in the virtual robot dynamic model, and the sum is performed such that a minimum is found for a set of inertial properties.

For each of the one or more real joint torque measurements $\tau\_real$, a corresponding simulated joint torque value $\tau\_simulation$ is determined (204). The simulated joint torque value $\tau\_simulation$ includes a system of dynamic equations relating a current estimate of robot inertial properties 108 to a simulated torque value. Recursive inverse dynamics (e.g., Featherstone algorithm) for an articulated rigid body is applied to the joint physical parameter values (e.g. joint position values extracted from the robot joint physical parameter measurements 112, as well as joint velocity values and joint acceleration values computed from finite differencing module 116-1) to find the simulated joint torque values, $\tau\_simulation$. The nonlinear least squares module 116-3 may then output, to the robot management system 104, a cost-function including the nonlinear least squares cost-function. The robot management system 104 may then provide the nonlinear least squares equation to the cost-function optimization module 116-4.

The cost-function optimization module 116-4 receives the formulated nonlinear least squares equation as input, and utilizes a current estimate of one or more robot inertial properties 108. The current estimate of the real-world robot's 102 robot inertial properties 108 is then adjusted to minimize the absolute difference between the simulated joint torque and the corresponding measured joint torque (206). In other words, the nonlinear least squares equation is minimized to solve for one or more updated values of the robot inertial properties 108 of the real-world robot 102 (e.g., mass, center of mass, inertia tensor). The current estimate of the one or more robot inertial properties 108 is then updated by the robot management system 104 to be used in the virtual robot dynamic model 114.

Trust region method is used to solve the nonlinear least square problem in 116-3. Various computer programs may be used to perform this optimization algorithm, for example the open source optimization solver Ceres.

As described with reference to FIG. 2, the robot inertial properties 108 may be adjusted for a given set of one or more robot joint physical parameter measurements corresponding to a range of motion for a real-world robot. In some implementations, the process for adjusting the robot inertial properties 108 used by the virtual robot dynamic model 114 may occur as a single training process, such that a one-occurrence training of the model would reduce the reality gap between the virtual robot dynamic model 114 and the real-world robot 102 by a desired amount.

In some implementations, updating the robot inertial properties 108 in the virtual robot dynamic model 114 for a real-world robot 102 may occur on a periodic or random basis. The frequency of the updating may depend on various factors, including lifetime (e.g., wear and tear) of the robot, environmental changes (e.g., altitude changes, temperature changes), alteration in a range of motion of operation (e.g., a wider arch of movement), changes in hardware (e.g., a part replacement), or the like. Additionally, installing new control software (e.g., new drivers), may require a retraining of the virtual robot dynamic model 114.

In some implementations, robot joint physical parameter measurements 112 used in the process described herein to update the virtual robot dynamic model 114 include joint position and joint torque. Robots may not have encoders located on joints of interest, and therefore the model must extract the joint velocity and joint acceleration values from joint position measurements using post-processing rather than by directly measuring joint velocity and joint acceleration values.

In some implementations, measured robot joint physical parameter measurements 112 include joint position, joint torque, joint velocity, and joint acceleration.

In some implementations, other real-world robot properties may be optimized. For example, joint friction or robot control parameters (e.g., PID control gains). Other approximations in simulation may be used in addition to or instead of the virtual robot dynamic model including a sensor model, a compliant contact model, a joint friction model, a motor model, and a noise model. One or more of these models may be used in addition to, or instead of, the virtual robot dynamic model described herein. Optimization of properties of a real-world robot other than (or in addition to) the inertial properties may also be desired. For example, joint friction and/or joint control.

In some implementations, static joint physical parameter data may be collected and mass and center-of-mass inertial property values for the real-world robot may be optimized while disregarding the inertia tensor. For a static joint physical parameter measurement, join torque is measured while joint velocity and joint acceleration are zero.

In some implementations, multiple inertial properties (e.g., mass, center-of-mass, inertia tensor) may be optimized concurrently, suing dynamic motion data of the real-world robot 102.

In some implementations, two or more of the inertia properties of the real-world robot 102 (e.g., robot mass, center-of-mass, and inertia tensor) may be optimized sequentially.

In some implementations, a virtual robot dynamic model 114 is a neural network.

In some implementations, multiple approaches may be used to validate results from the virtual dynamic robot model including comparing a measured torque not used in the training of the model to a respective simulated torque. Another validation approach may include operating a real-world robot in toque control mode with feedback, and comparing a motion trajectory executed by the real-world robot (e.g., a linear motion gesture) to the respective simulated motion trajectory.

The different methods and techniques described herein may be utilized in a variety of implementations for reducing the reality gap between simulation and a real world robot, and the discussed exemplary implementations discussed herein do not represent the full extent of implementations possible. A number of embodiments of the invention have been described. Nevertheless, it will be understood that various modifications may be made without departing from the spirit and scope of the invention.

Figure 3:
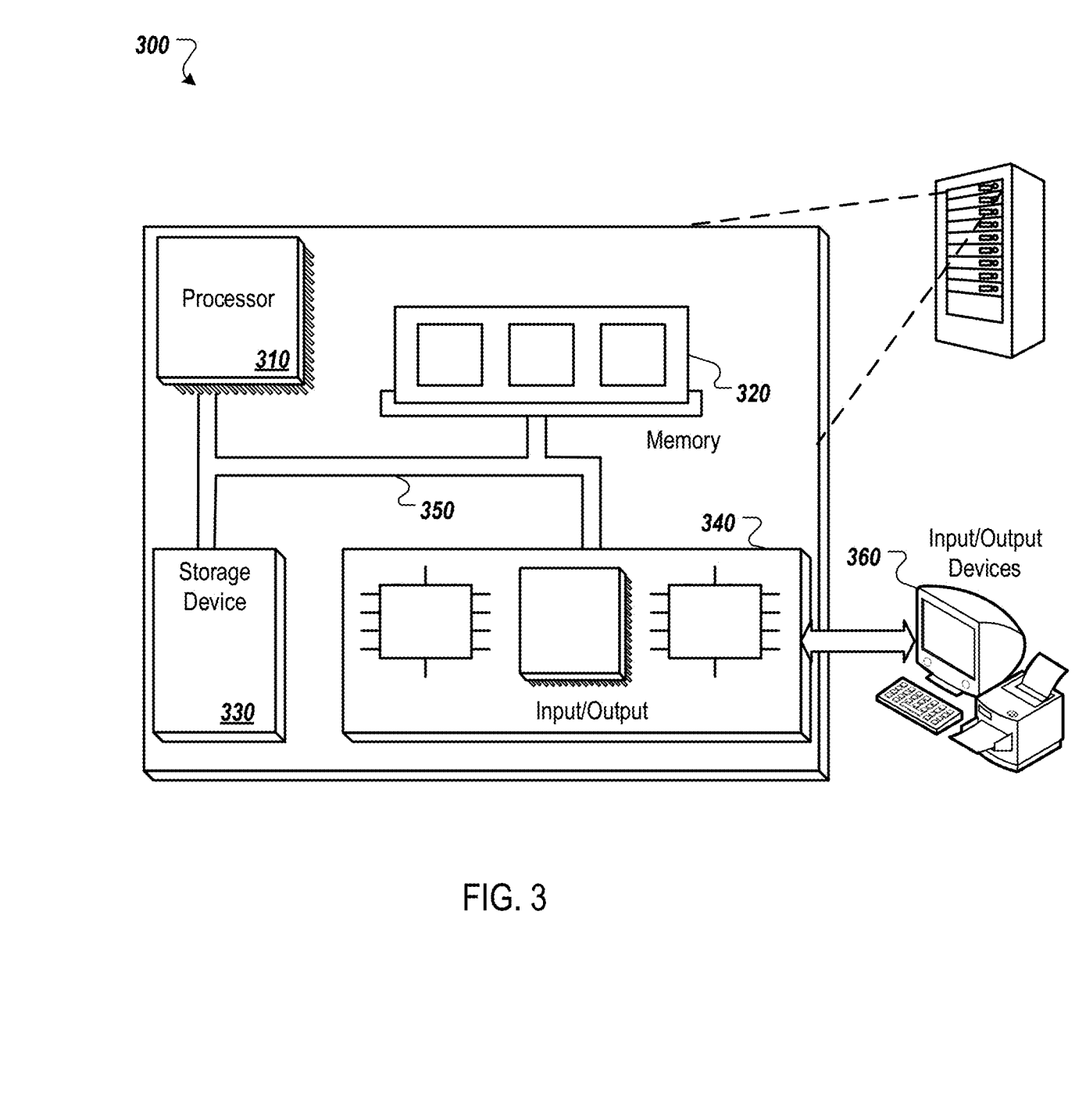
FIG. 3 is block diagram of an example computer system.

FIG. 3 is block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In one implementation, the input/output device 340 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non- volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a relationship graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    obtaining, by a robot management system operating a real-world robot, a plurality of joint physical parameter measurements for the joints of the real-world robot; and
    adjusting, by the robot management system and using the plurality of joint physical parameter measurements, an estimate of one or more inertial properties of the real-world robot used by a virtual robot dynamic model to simulate interactions of the real-world robot with an environment, comprising:
        determining, by the robot management system and using the virtual robot dynamic model and in accordance with a current estimate of the one or more inertial properties, a respective plurality of simulated joint physical parameter values corresponding to each of the plurality of joint physical parameter measurements;
        adjusting, by the robot management system, the current estimate of the one or more inertial properties utilized by the virtual robot dynamic model to minimize a summation of differences between each simulated joint physical parameter value of the plurality of simulated joint physical parameter values and the corresponding joint physical parameter measurement of the plurality of joint physical parameter measurements in a nonlinear least squares equation.

2. The method of claim 1, wherein determining the respective plurality of simulated joint physical parameter values comprises, for each of the plurality of joint physical parameter measurements:
    determining, by the robot management system and the virtual robot dynamic model, using data corresponding to a joint physical parameter measurement and the current estimate of the one or more inertial properties, a corresponding simulated joint physical parameter value using recursive inverse dynamics.

3. The method of claim 1, wherein the joint physical parameter measurements include a joint torque measurement and/or a joint position measurement, and the simulated physical parameter values include a simulated joint torque value and/or a simulated joint position value.

4. The method of claim 3, further comprising calculating one or more joint velocity values and joint acceleration values from one or more joint position measurements using a finite differencing method.

5. The method of claim 4, further comprising performing noise reduction on one or more of the joint velocity values and joint acceleration values using a median filter.

6. The method of claim 1, wherein the one or more inertial properties include one or more of a real-world robot mass, a center of mass, and/or an inertia tensor.

7. A system, comprising:
    one or more data processing apparatus; and
    a non-transitory memory storage in data communication with the one or more data processing apparatus and storing instructions executable by the data processing apparatus and that upon such execution cause the data processing apparatus to perform operations comprising:
        obtaining, by a robot management system on the one or more data processing apparatus and in communication with a real-world robot, a plurality of joint physical parameter measurements for the joints of the real-world robot; and
        adjusting, by the robot management system and using the plurality of joint physical parameter measurements, an estimate of one or more inertial properties of the real-world robot used by a virtual robot dynamic model to simulate interactions of the real-world robot with an environment, comprising:
            determining, by the robot management system and using the virtual robot dynamic model and in accordance with a current estimate of the one or more inertial properties, a respective plurality of simulated joint physical parameter values corresponding to each of the plurality of joint physical parameter measurements;
            adjusting, by the robot management system, the current estimate of the one or more inertial properties utilized by the virtual robot dynamic model to minimize a summation of differences between each simulated joint physical parameter value of the plurality of simulated joint physical parameter values and the corresponding joint physical parameter measurement of the plurality of joint physical parameter measurements in a nonlinear least squares equation.

8. The system of claim 7, wherein determining the respective plurality of simulated joint physical parameter values comprises, for each of the plurality of joint physical parameter measurements:
    determining, by the robot management system and the virtual robot dynamic model, using data corresponding to a joint physical parameter measurement and the current estimate of the one or more inertial properties, a corresponding simulated joint physical parameter value using recursive inverse dynamics.

9. The system of claim 7, wherein the joint physical parameter measurements include a joint torque measurement and/or a joint position measurement, and the simulated physical parameter values include a simulated joint torque value and/or a simulated joint position value.

10. The system of claim 7, wherein the operations further comprise:
    calculating one or more joint velocity values and joint acceleration values from one or more joint position measurements using a finite differencing method.

11. The system of claim 10, wherein the operations further comprise:
    performing noise reduction on one or more of the joint velocity values and joint acceleration values using a median filter.

12. The system of claim 7, wherein the one or more inertial properties include one or more of a real-world robot mass, a center of mass, and/or an inertia tensor.

13. One or more non-transitory computer-storage media storing instructions that when executed by one or more data processing apparatus cause the one or more data processing apparatus to perform operations comprising:

obtaining, by a robot management system on the one or more data processing apparatus and in communication with a real-world robot, a plurality of joint physical parameter measurements for the joints of the real-world robot; and adjusting, by the robot management system and using the plurality of joint physical parameter measurements, an estimate of one or more inertial properties of the real-world robot used by a virtual robot dynamic model to simulate interactions of the real-world robot with an environment, comprising:

determining, by the robot management system and using the virtual robot dynamic model and in accordance with a current estimate of the one or more inertial properties, a respective plurality of simulated joint physical parameter values corresponding to each of the plurality of joint physical parameter measurements; and adjusting, by the robot management, the current estimate of the one or more inertial properties utilized by the virtual robot dynamic model to minimize a summation of differences between each simulated joint physical parameter value of the plurality of simulated joint physical parameter values and the corresponding joint physical parameter measurement of the plurality of joint physical parameter measurements in a nonlinear least squares equation.

14. The one or more computer-storage media of claim 13, wherein determining the respective plurality of simulated joint physical parameter values comprises, for each of the plurality of joint physical parameter measurements:

determining, by the robot management system and the virtual robot dynamic model, using data corresponding to a joint physical parameter measurement and the current estimate of the one or more inertial properties, a corresponding simulated joint physical parameter value using recursive inverse dynamics.

15. The one or more computer-storage media of claim 13, wherein the joint physical parameter measurements include a joint torque measurement and/or a joint position measurement, and the simulated physical parameter values include a simulated joint torque value and/or a simulated joint position value.

16. The one or more computer-storage media of claim 13, wherein the operations further comprise:

calculating one or more joint velocity values and joint acceleration values from one or more joint position measurements using a finite differencing method; and performing noise reduction on one or more of the joint velocity values and joint acceleration values using a median filter.

17. The one or more computer-storage media of claim 13, wherein the one or more inertial properties include one or more of a real-world robot mass, a center of mass, and/or an inertia tensor.

* * * * *